(12) United States Patent
Ackerman et al.

(10) Patent No.: US 6,186,937 B1
(45) Date of Patent: Feb. 13, 2001

(54) METHOD AND DEVICE FOR OBTAINING A DESIRED PHASE OF OPTICAL CHARACTERISTIC OF A FABRY-PEROT ETALON

(75) Inventors: David A. Ackerman, Hopewell; Thomas L. Koch, Holmdel, both of NJ (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/365,085

(22) Filed: Jul. 30, 1999

(51) Int. Cl.$^7$ .................................................. G01B 9/02
(52) U.S. Cl. ........................................ 506/352; 356/454

(56) References Cited

U.S. PATENT DOCUMENTS 5,151,585 * 9/1992 Siebert ................................. 356/352
5,189,677 * 2/1993 Yry ...................................... 356/349

* cited by examiner

Primary Examiner—Robert Kim
(74) Attorney, Agent, or Firm—Stroock & Stroock & Lavan LLP

(57) ABSTRACT

A method and device for obtaining a desired phase of optical characteristic of a Fabry-Perot (FP) etalon using multiple optical detectors which, while passively aligned at various positions relative to an incident light beam, detect different phases of light signal emerging from the FP etalon. An FP etalon and optical detector array constructed in accordance with the present invention may be used as a frequency discriminator in an optical system where the FP etalon optical characteristic is required to have a particular phase.

35 Claims, 3 Drawing Sheets

METHOD AND DEVICE FOR OBTAINING A DESIRED PHASE OF OPTICAL CHARACTERISTIC OF A FABRY-PEROT ETALON

FIELD OF THE INVENTION

The present invention relates to Fabry-Perot Etalons and, more particularly, to a method and device for obtaining a desired phase of optical characteristic of a Fabry-Perot etalon using a plurality of optical detectors.

BACKGROUND OF THE INVENTION

Fabry-Perot (FP) etalons are used as optical frequency discriminators in devices that monitor and control the optical frequency of optical sources such as semiconductor laser diodes (the terms optical sources and light sources are used interchangeably herein). An attractive feature of FP etalons is the periodic nature of their transmission and reflection (i.e., optical) characteristics. The periodicity or free spectral range (FSR) of the etalon optical characteristics can be matched to characteristics of the optical system in which the etalon is to be employed by selecting an etalon having a specific optical thickness, which is defined by the product of the etalon physical thickness and its refractive index. For example, the FSR of an etalon can be matched to the channel spacing of a wavelength division multiplex (WDM) optical communication system.

Manufacture of etalons with a precisely specified FSR requires tight control of the etalon physical thickness. Typically, the FSR of a FP etalon can be controlled to better than 0.5% for a FSR range of approximately 100 GHz, and a wavelength of approximately 1,550 nanometers (nm). However, the absolute frequencies of the peaks, valleys and flanks of the FP optical characteristic, which are determined by the phase of the interference of light signals within the etalon, are far more difficult to control in manufacture. Unfortunately, it is this phase of optical characteristics which permits a FP etalon to operate as a frequency discriminator. Consequently, control of this characteristic is essential to using FP etalons as frequency discriminators.

Variations in the physical thickness of an etalon will cause the phase of optical characteristic of the etalon to shift. The phase of an FP etalon optical characteristic will vary over a range of $2\pi$ radians (360°) for each change in optical thickness equal to ½ of one optical wavelength within the etalon. For example, for a wavelength of 1550 nm and a 1 mm thick etalon of refractive index of approximately 1.5, a change of physical thickness of approximately 520 nm causes a $2\pi$ change of phase in the etalon optical characteristic. To set the phase characteristic of the etalon at a particular value, i.e., $0\pm\pi/10$ radians, the etalon thickness cannot vary more than ±26 nm over its entire surface area. Such constrained manufacturing tolerances are far beyond the capabilities that exist today. In other words, it simply is not feasible to manufacture a FP etalon to achieve a preset phase of optical characteristic. Rather, in manufacture, the phases of a batch of etalons are randomly distributed and each etalon must be manually tuned to provide the desired optical characteristic.

In practice, a single optical detector is used in connection with the FP etalon and the desired phase of FP optical characteristic is obtained by mechanically rotating or tuning the position or angle of the etalon relative to the beam of light incident upon it. Rotation of the etalon effectively varies its thickness as seen by the incident light beam. For example, an etalon can be rotated relative to an incident beam while monitoring the optical characteristic of a transmitted or reflected beam until a desired result is achieved. This operation, involving sequential and repetitive tuning and monitoring, is referred to as active alignment and is time-consuming and expensive. Passive alignment, on the other hand, in which an etalon is fixed in place before testing, is considered to be a more cost effective and preferred alternative for setting the etalon's phase of optical characteristic. Unfortunately, due to the manufacturing tolerances in etalon thickness, passive alignment does not provide an acceptable solution when a single detector is used.

There thus exists a need in the art for a method of obtaining a desired phase of optical characteristic of a FP etalon, without specifying physical dimensions of the etalon to tighter tolerances then are currently practical, and without requiring active alignment to tune the etalon.

SUMMARY OF THE INVENTION

The present invention is directed to a method and device for obtaining a desired phase of optical characteristic of a Fabry-Perot etalon.

The present invention is directed to a method of controlling the frequency of an optical source that defines an optical axis and that radiates an optical signal. The method comprises providing a Fabry-Perot etalon along the optical axis, the etalon having an incident surface upon which the optical signal impinges, and an exit surface through which an exit optical signal emerges. A plurality of optical detectors are provided at the exit surface of the etalon at various positions relative to the optical axis. Each of the plurality of optical detectors detects an exit optical signal having a different phase characteristic. An optical detector that detects a desired phase characteristic may then be selected.

The present invention is also directed to a method of controlling the frequency of an optical source that defines an optical axis and that radiates an optical signal. The method comprises providing a Fabry-Perot etalon along the optical axis, the etalon having an incident surface upon which the optical signal impinges, and an exit surface from which an exit optical signal emerges. A plurality of optical detectors are placed at an exit surface of the Fabry-Perot etalon and the spectra that each of the plurality of detectors will detect as a function of wavelength is determined. Each of the plurality of optical detectors detects an exit optical signal having a different phase characteristic and an optical detector that detects a desired phase characteristic is selected.

More than one of the plurality of optical detectors may detect the desired phase characteristic. Using a microprocessor and an appropriate algorithm, the present invention may determine which of the optical detectors are detecting the desired phase characteristic and select all of the optical detectors that detect the desired phase characteristic.

The present invention may be used as part of a closed-loop frequency discrimination system which includes an optical source for radiating an optical signal at a predetermined frequency along an optical axis. The system also includes a frequency discriminator for detecting the optical signal radiated by the optical source. The frequency discriminator comprises a Fabry-Perot etalon having an incident surface upon which the optical signal impinges and an exit surface through which an exit optical signal emerges. The discriminator further comprises an optical detector array having a plurality of optical detectors arranged at the exit surface of the etalon at various positions with respect to the optical axis, where each of the plurality of optical detectors detects a different phase characteristic of the exit optical signal. The closed-loop system also includes a controller connected to the optical source for adjusting the optical source to control the frequency of the optical signal radiated thereby.

The present invention may also be used in an open-loop optical transmission system that includes an optical source for radiating an optical signal at a predetermined frequency along an optical axis. The open-loop system also includes a frequency discriminator for detecting the optical signal radiated by the optical source. The frequency discriminator comprising a Fabry-Perot etalon having an incident surface upon which the optical signal impinges and an exit surface through which an exit optical signal emerges. The discriminator further comprises an optical detector array having a plurality of optical detectors arranged at the exit surface of the etalon at various positions with respect to the optical axis, where each of said plurality of optical detectors detecting a different phase characteristic of the exit optical signal. The open-loop system also includes a detector connected to the frequency discriminator for detecting an optical signal.

The present invention is further directed to a method of detecting a predetermined frequency in a multi-frequency optical signal radiated by an optical source along an optical axis. The method comprises receiving the multi-frequency optical signal by a Fabry-Perot etalon having an incident surface upon which the multi-frequency optical signal impinges, and an exit surface through which a single frequency optical signal emerges. A plurality of optical detectors are provided at the exit surface of the etalon, and each of the plurality of optical detectors detects an exit optical signal at the predetermined frequency having a different phase characteristic. An optical detector that detects a desired phase characteristic is then selected.

The present invention is also directed to a method of obtaining a desired phase of optical characteristic of a Fabry-Perot etalon. This method comprises providing an optical array having a plurality of optical detectors at an exit surface of the etalon and directing an optical signal along an optical axis toward an incident surface of the etalon. Each of the plurality of optical detectors detects an exit optical signal having a different phase of optical characteristic and an optical detector that detects the desired phase of optical characteristic is selected.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention provides a method and device for obtaining a desired phase of optical characteristic of a Fabry-Perot (FP) etalon using multiple optical detectors which, while passively aligned at various positions relative to an incident light beam, detect different phases of light signal emerging from the FP etalon. An FP etalon and optical detector array constructed in accordance with the present invention may be used as a frequency discriminator in an optical system where the FP etalon optical characteristic is required to have a particular phase.

The terms "frequency" and "wavelength" are used interchangeably herein and are related by the equation $f_{Hz}=c/\lambda_{nm}$ where c equals $3\times10^{17}$ nm/s.

Figure 1:
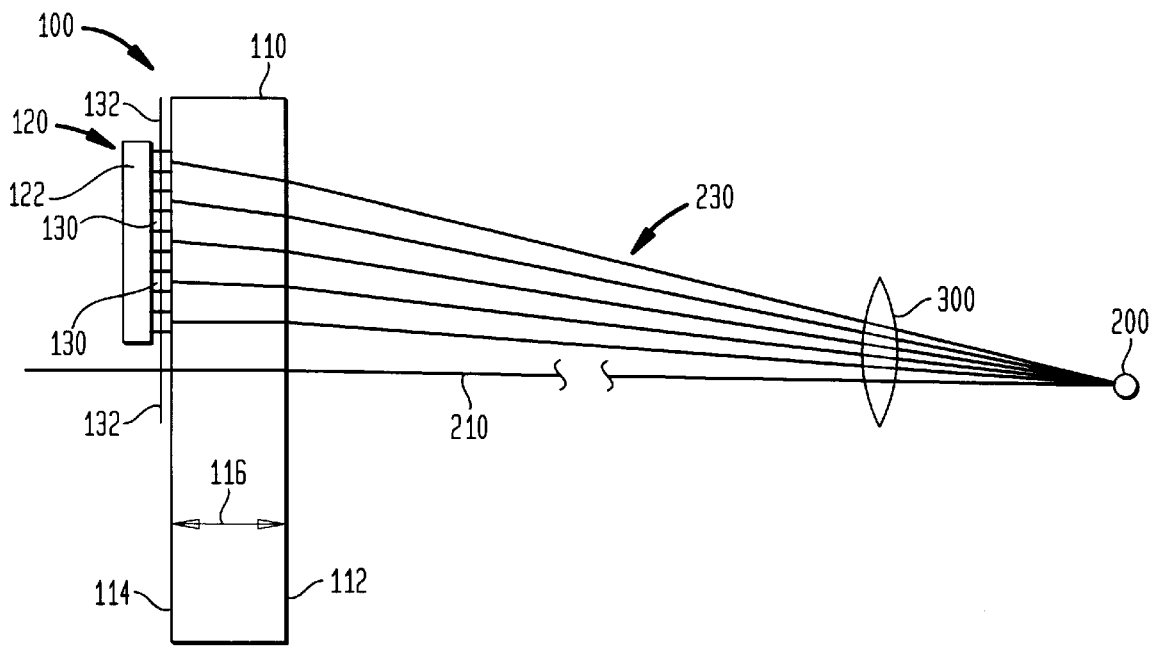
FIG. 1 is a schematic view of a Fabry-Perot (FP) etalon and an optical detector array constructed in accordance with the present invention.

Referring now to the drawings in detail, FIG. 1 depicts a Fabry-Perot (FP) etalon 110 having an incident surface 112 through which light rays may enter the etalon 110 and an exit surface 114 through which light rays may emerge from the etalon 110. The optical thickness of the etalon 110, which is defined as the product of the physical thickness 116 (the distance between the incident surface 112 and exit surface 114) and the group refractive index $n_g$ (which for some materials is nearly the same as the refractive index n), determines the free spectral range (FSR) of the etalon 110. Minor variations in the physical thickness 116 will cause the phase of the etalon 110 transmission or reflection characteristic, i.e., the optical characteristic, to change. For example, the phase of an etalon 110 optical characteristic may vary over a range of approximately $2\pi$ radians (360°) for a change in optical thickness equal to one-half an optical wavelength within the etalon 110. Since it is virtually impossible to provide an etalon 110 having a uniform physical thickness 116, it is therefore virtually impossible to provide an etalon 110 having a desired phase characteristic.

An optical array 120 having a plurality of optical detectors 130 mounted on a substrate 122 are provided at the exit surface 114 of the etalon 110. The detectors 130 preferably contact the exit surface 114 and are arranged in spaced-apart relation to each other and to the optical axis 210. The detectors 130 are disposed along a detector axis 132 that is substantially parallel with the exit surface 114 and approximately perpendicular to the optical axis 210. The vertical spacing between adjacent detectors 130 depends in part on the number of detectors 130 provided in the detector array 120 and the amount of discrimination required by the detectors 130.

With continued reference to FIG. 1, a point light source 200 (e.g., a semiconductor diode laser) radiates a generally monochromatic optical or light signal 230 having a predetermined frequency (and wavelength) along an optical axis 210 that is approximately perpendicular to the incident surface 112 of the FP etalon 110. The frequency distribution (or wavelength distribution) of the optical signal 230 is small with respect to the frequency (or wavelength) of the signal itself. The optical signal 230 is directed through a collimating lens 300 which partially collimates the signal 230 and causes it to have a diameter that is approximately equal to the distance between the outermost optical detectors 130 in the detector array 120.

The optical signal 230 impinges upon the incident surface 112 and emerges from the exit surface 114 of the etalon 110.

The varying physical thickness of the etalons 110 means that individual etalons 110 may have a different phase of optical characteristic. Because the optical detectors 130 are displaced (generally orthogonally) with respect to the optical axis 210, the distance traveled by an optical signal 230 through the etalon 110 to each detector 130 is different. Consequently, each detector 130 presents a different phase of optical characteristic of the etalon 110 and a desired phase may be obtained by selecting the optical detector 130 that provides the desired phase.

Figure 2:
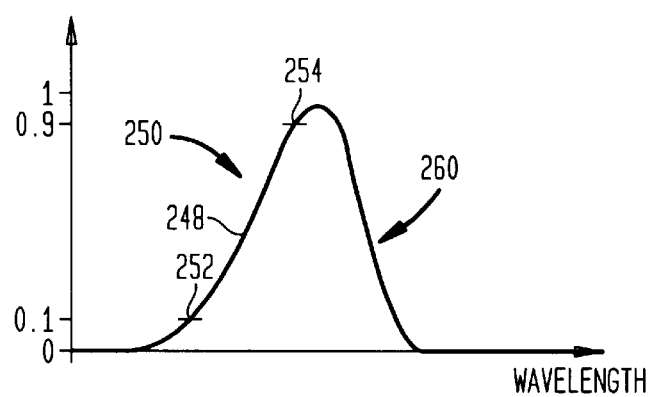
FIG. 2 a transfer function graph of an optical signal radiated by a point light source.

One criteria for a desired phase considers only a predetermined part of an optical signal 230. Referring next to FIG. 2, a transfer function of an optical signal 230 is depicted. The signal 230 includes a useful part 248 that is depicted as a part of a rising edge 250 of the signal 230 and that excludes the maximum and minimum portions (i.e., peaks and valleys) of the signal. Depending upon the specific application, the useful part 248 may alternatively comprise a part of the falling edge 260. The useful part 248 is that part of the optical signal 230 which permits an optical detector 130 to discriminate between differently phased optical signals. For example, the useful part 248 may comprise the portion of the rising edge 250 between 10% and 90% of the maximum amplitude of the signal 230, as indicated by reference numbers 252 and 254, respectively. Alternatively, the useful part 250 may comprise a predetermined range of amplitude where the amplitude swing of the optical signal is known (e.g., between 0.9 and 4.1 volts). The useful part 248 of the optical signal 230 is further characterized by a positive or negative slope and a relatively constant derivative value in a preferred embodiment. Peaks and valleys, where the derivative value is small, and falling edges 260, where the slope is negative, are not considered useful parts of the optical signal 230, in a preferred embodiment although they could be used in alternate arrangements. Characterizing the useful part 248 using these two properties and selecting an appropriate detector 130, a point on an FP transmission characteristic which lies between an upper and lower bound, with a derivative of a given sense, can be detected by the optical detector 130. By following this procedure, portions of the transmission characteristics with the undesirable properties of being too close to extrema or having a derivative of the unwanted sense are not considered by the detectors 130.

Figure 3:
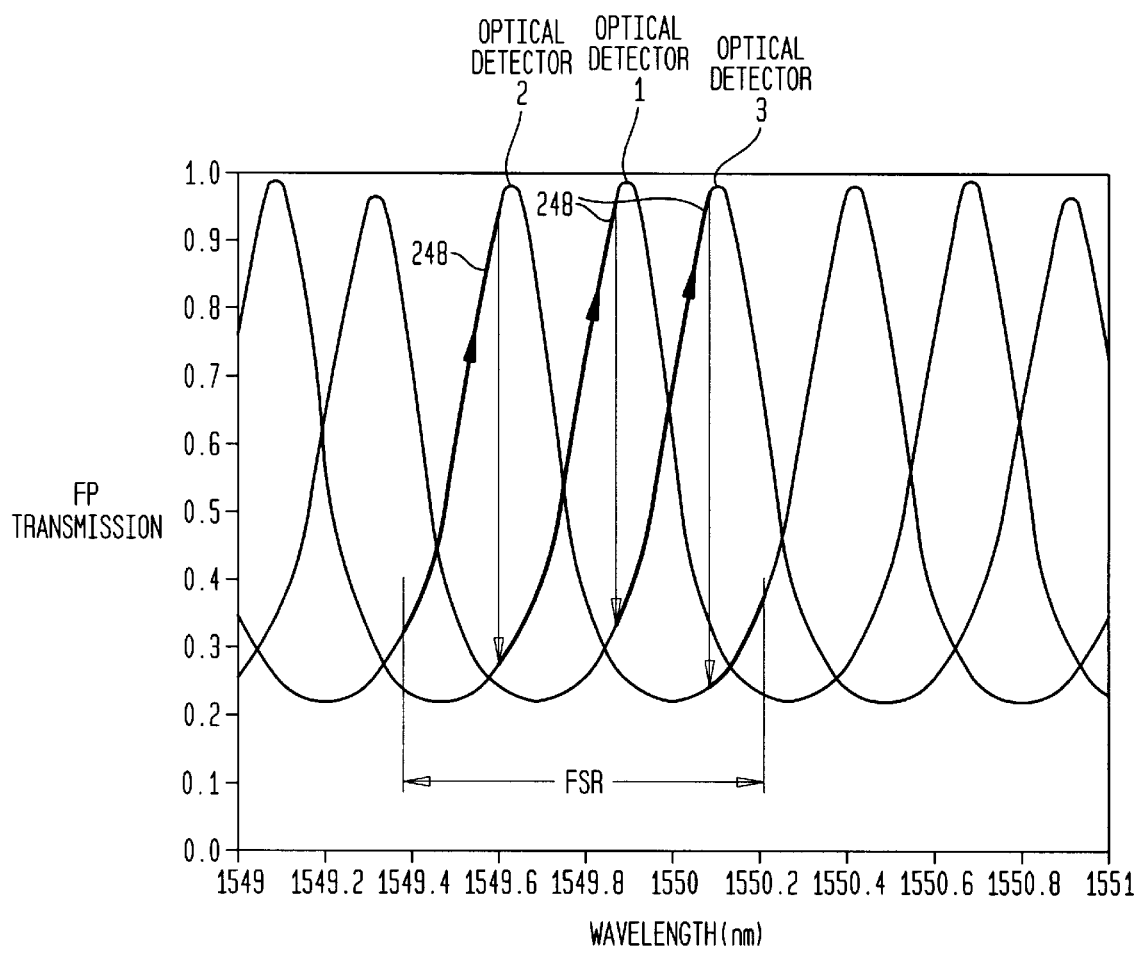
FIG. 3 is a graph of the calculated spectra detectable by three optical detectors arranged as depicted in FIG. 1.

The spectra depicted in FIG. 3 are the calculated spectra that would be detectable by each of three optical detectors 130 positioned at approximately 2.8, 3.4, and 4.0 mm from the optical axis 210. In this illustrative, non-limiting example, the optical signal 230 diverges at approximately 2° and a relatively low finesse etalon 110 with a 36% power reflectivity coating is provided. The useful part 248 is depicted by the bold portion of each spectra, and may or may not overlap between and among the spectra. However, it is desirable that the useful part 248 overlap between and among the spectra so that more than one optical detector 130 can detect the useful part 248, thus providing more than one choice of optical detector to obtain the desired phase characteristic. For an optical signal having a predetermined frequency (or wavelength), and for a desired FSR, three optical detectors 130 will provide the ability to obtain a desired phase of optical characteristic of an FP etalon 110.

Figure 4:
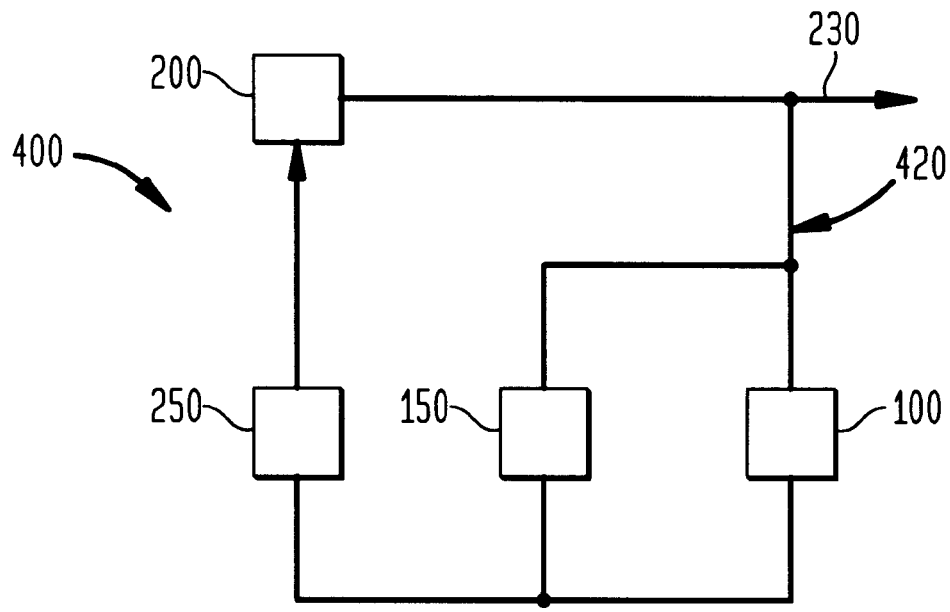
FIG. 4 is a block diagram of a closed-loop frequency stabilization circuit including a Fabry-Perot etalon and optical detector array constructed in accordance with the present invention.

In an illustrative, non-limiting application, depicted in FIG. 4, a frequency discriminator 100 (including a FP etalon 110 and optical detector array 120) is provided in the feedback loop 420 of a closed-loop frequency stabilization circuit 400. The circuit 400 includes an optical source 200 that transmits an optical signal 230 having a predetermining frequency at a predetermined power level. The discriminator 100 cannot distinguish between a change of frequency at constant power and a change of power at constant frequency. Therefore, a power detector 150 is placed in parallel with the discriminator 100 and the power output from each of the discriminator 100 and detector 150 is considered. More specifically, a ratio of the discriminator power and detector power is derived such that a change in the ratio indicates a change in the optical signal frequency. For example, if the power detected by the discriminator 100 is 0.5 mW and the power detected by the detector is 1 mW, a change in power of the optical signal 230 will cause both the discriminator and detector power levels to change, thus resulting in no change in the ratio. On the other hand, if the frequency of the optical signal 230 changes, only the power detected by the discriminator 100 will change, thus causing the ratio to change. A controller 250, including known comparator and control circuits and devices, can thus be used in combination with the discriminator 100 of the present invention, to detect changes in the frequency of an optical signal 230 and to effect control of the optical source 200 to offset such changes.

Figure 5:
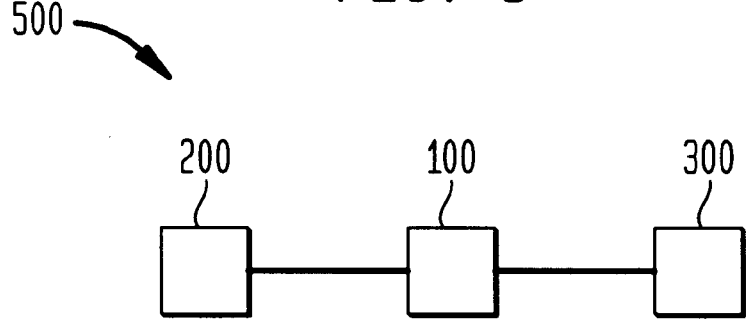
FIG. 5 is a block diagram of an open-loop optical signal detector including a Fabry-Perot etalon and optical detector array constructed in accordance with the present invention.

The present invention may also be used as part of an open-loop optical system to detect the wavelength of an optical signal 230. As depicted in FIG. 5, a discriminator 100 constructed in accordance with the present invention (see, e.g., FIG. 1), is provided in an open-loop optical transmission system 500 that includes an optical source 200 and optical detection circuitry 300. In such a system, it may be desirable to continuously detect an optical signal, regardless of the signal's wavelength. The optical detection circuitry 300 may be configured to continuously poll the plurality of optical detectors 130 of the detector array 120, and to determine which detector 130 is receiving a useful part 248 of an optical signal 230. In this system 500, the wavelength or frequency of the optical signal 230 is not important, and the discriminator 100 of the present invention need only detect a useful part 248 of any optical signal 230 and produce an output optical or electrical signal indicating that an optical signal is continuously detected or received from the optical source 200.

In the open-loop system 500 of FIG. 5, all of the detectors 130 in the detector array 120 are simultaneously active and connected in parallel to detection circuitry 300. When used in this manner, the discriminator 100 of the present invention can continuously detect an optical signal 230 from the optical source despite the fact that the frequency or wavelength of the optical signal 230 may vary over a time period. The detection circuitry 300 may also detect and record (i.e., count) the number of times each detector 130 detects a useful part 248 of the optical signal 230 and even the wavelength or frequency with which the various detectors of the detector array 120 are activated by the optical signal 230. In other words, the discriminator 100 of the present invention, when connected with appropriate electronics, can detect and record changes in the optical source frequency and/or wavelength and the rate and duration of such changes. Thus, historical performance data for the light source may be recorded. In this alternative embodiment, such changes in the light source wavelength, for example, can be in the range of hundreds of nanometers.

A frequency discriminator 100 constructed in accordance with the present invention may also detect a frequency in an optical signal comprised of a plurality of signals at different frequencies, i.e., a multi-frequency optical signal. The FP etalon 110 is manufactured to a particular thickness to achieve a desired FSR, that FSR matching the FSR of the particular frequency in the multi-frequency signal. The optical detector array 120 is then used, as described in detail above, to obtain a desired phase of optical characteristic of the FP etalon 110, thus tuning the etalon 110 to the particular frequency. When placed in a transmission path of a multi-frequency optical signal, the frequency discriminator 100 can detect the particular frequency.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of controlling the frequency of an optical source that defines an optical axis and that radiates an optical signal, said method comprising the steps of:
    (a) providing a Fabry-Perot etalon along the optical axis, the etalon having a substantially planar incident surface upon which the optical signal impinges, and a substantially planar exit surface from which an exit optical signal emerges;
    (b) providing a plurality of optical detectors at the exit surface of the etalon at various positions relative to the optical axis;
    (c) detecting, by each of the plurality of optical detectors, an exit optical signal having a different phase characteristic; and
    (d) selecting an optical detector that detects a desired phase characteristic of the optical signal.

2. A method as recited by claim 1, further comprising the steps of:
    (e) detecting an optical signal power lever;
    (f) detecting an exit optical signal power level;
    (g) comparing the optical signal power level and the exit optical signal power level; and
    (h) adjusting the optical source if the comparison of said step (g) indicates a change in frequency of the optical signal.

3. A method as recited by claim 1, wherein said step (b) comprises providing at least three optical detectors at the exit surface of the etalon at various positions relative to the optical axis.

4. A method as recited by claim 3, wherein said step (b) comprises providing three optical detectors at the exit surface of the etalon at various positions generally orthogonal to the optical axis.

5. A method as recited by claim 1, wherein the exit optical signal includes a useful part defined by a part of the slope of the exit optical signal where the slope has a maximum and relatively constant value, wherein said step (c) comprises detecting, by each of the plurality of optical detectors, the useful part of an exit optical signal having a different phase characteristic.

6. A method as recited by claim 1, wherein the exit optical signal has a maximum amplitude and includes a useful part defined as a part of the exit optical signal located between approximately 10% and 90% of the maximum amplitude of the exit optical signal, wherein said step (c) comprises detecting, by each of the plurality of optical detectors, the useful part of an exit optical signal having a different phase characteristic.

7. A method as recited by claim 1, wherein the optical signal defines a free spectral range, wherein said step (b) comprises providing a plurality of optical detectors at the exit surface of the etalon at various positions relative to the optical axis such that the free spectral range is divided by the number of optical detectors provided into approximately equally sized frequency ranges, and wherein said step (c) comprises detecting, by each of the plurality of optical detectors, an exit optical signal having a different phase characteristic in an approximately equivalently sized frequency range.

8. A method as recited by claim 7, wherein the equally sized frequency ranges overlap each other.

9. A method as recited by claim 7, wherein the equally sized frequency ranges do not overlap each other.

10. A method as recited by claim 1, wherein said step (d) comprises selecting one or more optical detectors that detect a desired phase characteristic.

11. A method of controlling the frequency of an optical source that defines an optical axis and that radiates an optical signal, said method comprising the steps of:
    (a) providing a Fabry-Perot etalon along the optical axis, the etalon having a substantially planar incident surface upon which the optical signal impinges, and a substantially planar exit surface from which an exit optical signal emerges;
    (b) placing a plurality of optical detectors at the exit surface of the Fabry-Perot etalon;
    (c) determining the spectra each of the plurality of detectors will detect as a function of wavelength;
    (d) detecting, by each of the plurality of optical detectors, an exit optical signal having a different phase characteristic; and
    (e) selecting an optical detector that detects a desired phase characteristic of the optical signal.

12. A method as recited by claim 11, wherein said step (e) comprises selecting one or more optical detectors that detect a desired phase characteristic.

13. A method as recited by claim 11, further comprising the steps of:
    (f) detecting an optical signal power level;
    (g) detecting an exit optical signal power level;
    (h) comparing the optical signal power level and exit optical signal power level; and
    (i) adjusting the optical source if the comparison of said step (h) indicates a change in frequency of the optical signal.

14. A method as recited by claim 11, wherein said step (b) comprises placing a plurality of optical detectors at an exit surface of the Fabry-Perot etalon at positions generally orthogonal to the optical axis.

15. A method as recited by claim 11, wherein the exit optical signal includes a useful part defined by a part of the slope of the exit optical signal where the slope has a maximum value, wherein said step (d) comprises detecting, by each of the plurality of optical detectors, the useful part of an exit optical signal having a different phase characteristic.

16. A method as recited by claim 11, wherein the exit optical signal has a maximum amplitude and includes a useful part defined as a part of the exit optical signal located between approximately 10% and 90% of the maximum amplitude of the optical signal, wherein said step (d) comprises detecting, by each of the plurality of optical detectors, an exit optical signal having a different phase characteristic.

17. A method as recited by claim 11, wherein the optical signal defines a free spectral range, wherein said step (b) comprises placing a plurality of optical detectors at an exit surface of the Fabry-Perot etalon at various positions relative to the optical axis such that the free spectral range is divided by the number of optical detectors into approximately equally sized frequency ranges, and wherein said step (d) comprises detecting, by each of the plurality of optical detectors, an exit optical signal having a different phase characteristic in an approximately equivalently sized frequency range.

18. A method as recited by claim 17, wherein the equally sized frequency ranges overlap each other.

19. A method as recited by claim 17, wherein the equally sized frequency ranges do not overlap each other.

20. A closed-loop frequency discrimination system comprising:

an optical source for radiating an optical signal at a predetermined frequency along an optical axis;

a frequency discriminator for detecting the optical signal radiated by said optical source, said frequency discriminator comprising a Fabry-Perot etalon having a substantially planar incident surface upon which the optical signal impinges and a substantially planar exit surface from which an exit optical signal emerges, and an optical detector array having a plurality of optical detectors arranged at said exit surface of said etalon at various positions with respect to the optical axis, each of said plurality of optical detectors detecting a different phase characteristic of the exit optical signal; and a controller connected to said optical source to control the frequency of the optical signal radiated thereby.

21. A closed-loop frequency discrimination system as recited by claim 20, further comprising an optical power detector for detecting a power level of the optical signal, said exit optical signal having a power level and wherein the optical signal power level detected by said optical power detector is compared with the exit optical signal power level to detect changes in the frequency of the optical signal radiated by said optical source.

22. A closed-loop frequency discrimination system as recited by claim 20, wherein said plurality of optical detectors are arranged at various positions generally orthogonal to the optical axis.

23. An open-loop optical transmission system comprising:

an optical source for radiating an optical signal at a predetermined frequency along an optical axis;

a frequency discriminator for detecting the optical signal radiated by said optical source, said frequency discriminator comprising a Fabry-Perot etalon having a substantially planar incident surface upon which the optical signal impinges and a substantially planar exit surface from which an exit optical signal emerges, and an optical detector array having a plurality of optical detectors arranged at said exit surface of said etalon at various positions with respect to the optical axis, each of said plurality of optical detectors detecting a different phase characteristic of the exit optical signal; and a detector connected to said frequency discriminator for detecting the optical signal at the predetermined frequency.

24. An open-loop optical transmission system as recited by claim 23, wherein said plurality of optical detectors are arranged at various positions generally orthogonal to the optical axis.

25. A method of detecting a predetermined frequency in a multi-frequency optical signal radiated by an optical source along an optical axis, said method comprising the steps of:

(a) receiving the multi-frequency optical signal by a Fabry-Perot etalon having a substantially planar incident surface upon which the multi-frequency optical signal impinges, and a substantially planar exit surface from which a single frequency optical signal emerges;

(b) providing a plurality of optical detectors at the exit surface of the etalon;

(c) detecting, by each of the plurality of optical detectors, an exit optical signal at the predetermined frequency having a different phase characteristic; and (d) selecting an optical detector that detects a desired phase characteristic of the optical signal.

26. A method as recited by claim 25, wherein said step (d) comprises selecting one ore more optical detectors that detect a desired phase characteristic.

27. A method as recited by claim 25, wherein said step (b) comprises providing three optical detectors at the exit surface of the etalon at various positions relative to the optical axis.

28. A method as recited by claim 25, wherein said step (b) comprises providing three optical detectors at the exit surface of the etalon at various positions generally orthogonal to the optical axis.

29. A method as recited by claim 25, wherein the exit optical signal includes a useful part defined by a part of the slope of the exit optical signal where the slope has a maximum value, wherein said step (c) comprises detecting, by each of the plurality of optical detectors, the useful part of an exit optical signal at the predetermined frequency having a different phase characteristic.

30. A method as recited by claim 25, wherein the exit optical signal has a maximum amplitude and includes a useful part defined as a part of the exit optical signal located between approximately 10% and 90% of the maximum amplitude of the exit optical signal, wherein said step (c) comprises detecting, by each of the plurality of optical detectors, the useful part of an exit optical signal at the predetermined frequency having a different phase characteristic.

31. A method of obtaining a desired phase of optical characteristic of a Fabry-Perot etalon having a substantially planar incident surface and a substantially planar exit surface, said method comprising the steps of:

(a) providing an optical array having a plurality of optical detectors at the exit surface of the etalon;

(b) directing an optical signal along an optical axis toward the incident surface of the etalon;

(c) detecting, by each of the plurality of optical detectors, an exit optical signal having a different phase of optical characteristic; and (d) selecting an optical detector that detects the desired phase of optical characteristic of the optical signal.

32. A method as recited by claim 31, wherein said step (d) comprises selecting one or more optical detectors that detect the desired phase of optical characteristic.

33. A method as recited by claim 31, wherein said step (a) comprises providing an optical array having a plurality of optical detectors at an exit surface of the etalon at various positions generally orthogonal to the optical axis.

34. A method as recited by claim 31, wherein said step (b) comprises directing a multi-frequency optical signal along an optical axis toward an incident surface of the etalon.

35. A method as recited by claim 31, wherein said step (b) comprises directing an optical signal at a predetermined frequency along an optical axis toward an incident surface of the etalon.

* * * * *